United States Patent Office.

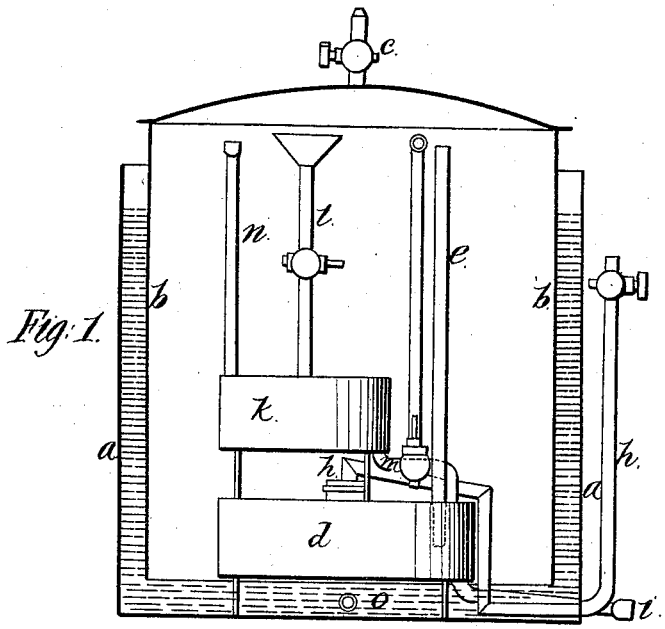

ROBERT ALSOP, OF PHILADELPHIA, PENNSYLVANIA.

Letters Patent No. 91,588, dated June 22, 1869.

IMPROVED APPARATUS FOR MANUFACTURING ILLUMINATING-GAS.

The Schedule referred to in these Letters Patent and making part of the same.

*To all whom it may concern:*

Be it known that I, ROBERT ALSOP, of the city of Philadelphia, in the State of Pennsylvania, attorney at law, have invented new and useful Improvements on Apparatus for Manufacturing Illuminating-Gas; and I do hereby declare that the following is a full, clear, and exact description of the construction and operation of the same, reference being had to the annexed drawings, where—

Figure 1 represents a sectional elevation through the apparatus.

Figure 2 represents a plan of the same.

Figure 3 represents a detail of the apparatus.

The object of this invention is to produce an illuminating-gas, by impregnating common atmospheric air with the vapor of suitable hydrocarbon-fluids, and is carried into effect by the employment of the apparatus now to be described.

In the drawings, similar letters of reference indicate corresponding parts.

Letter $a$ is the outside shell, or case of gasometer, or air-holder. It may be circular in form, as shown in the drawings, or of any other form suitable for the position in which it is to be placed.

It will be open at top, and closed at bottom, its dimensions being commensurate with the quantity of gas to be manufactured.

$b$ is the inner shell of the gasometer, and is of the same general form as the external casing, but sufficiently less in diameter to enable it to rise or fall freely in the outer case. It will be closed at the top, and opened at the bottom, as shown in fig. 1.

$c$ is a cock, or valve, to admit the air, when the inner case is to be raised for the purpose of filling. It may be placed in the centre, as shown, or in any other convenient place.

$d$ is the gas-generator, circular in form, as shown in fig. 3. It is closed at top and bottom.

On the inner side it is subdivided into sections, by diaphragms $f$ and $g$, both radiating and circular, as shown in fig. 3. These diaphragms extend from the bottom to the top.

The circular ones are made of tin, or other suitable metal, while the radiating ones are made of finely-perforated zinc, or other metal, and closely covered with cotton wicking.

$e$ is a pipe, extending above the level of the water in the outer case, for admitting the air into the gas-generator $d$, into which it is forced by the atmospheric pressure caused by the descent of the inner case $b$.

The air, on entering into the generator, follows through the spaces between the circular diaphragms, as indicated by the arrows in fig. 3, in its course passing through the radiating perforated diaphragms $f f$, to the centre, and from thence out of the generator by the pipe $h$.

This pipe $h$ is arranged substantially as shown in fig. 1, and leads to the burners.

$i$ is a pipe, leading from the bottom of the gas-generator, for the purpose of drawing off the fluid, when necessary.

$k$ is a tank, for holding the fluid which it receives by the funnelled pipe $l$, provided with a suitable stop-cock.

This tank $k$ is placed a short distance above the gas-generator, and is connected to it by the pipe $m$, also possessing a stop-cock. The bottom end of this pipe approaches within one inch of the bottom of the generator, so as to maintain the fluid at an equal level.

The cock in the pipe can be actuated by a long handle, or lever, rising above the level of the water in the outside casing.

$n$ is a pipe, for the escape of the atmospheric air from the tank $k$, when it is being filled with fluid, and may be provided with a stopper at its upper end.

$o$ is a tap, for emptying the water in the outer case.

With the foregoing brief description of my invention, to which I have given the name of "The Excelsior Gas-Machine," I will now proceed to describe its mode of action.

The apparatus being arranged substantially as described, with the outer casing filled to within three inches of its top with water, any suitable hydrocarbon-fluid is admitted by the pipe $l$ into the tank $k$, the air from which escapes by the pipe $n$. When the tank $k$ has been filled, the cock in pipe $l$ is closed, and the stopper placed in pipe $n$. The cock in pipe $m$ is then opened, and the fluid allowed to enter the generator, in which it will rise to the level of the bottom of the pipe $m$.

The radiating diaphragms $f$, standing in the fluid, are saturated by the ascent of the fluid, through capillary attraction, and the air, being forced into the generator by the pressure of the air in the gasometer, is forced through the saturated diaphragms, taking up the vapor as it passes through them, and escaping by the pipe $h$ leading to the burners, in the form of illuminating-gas.

When the tank $k$ requires filling, the inner case $b$ is raised clear of the outer case, the cock $c$ being first opened, to admit air, and a fresh supply of fluid is poured in the tube $l$, as before described, and so on.

The inner case $b$ is suspended by suitable compensating, or balance-weights, and the cock $c$ being opened, it is allowed to rise until the bottom is just below the surface of the water in the outer case. The cock $c$ is then closed, and the weights being adjusted, the descent of the inner case will force the illuminating-gas, so prepared, to the burners.

I am aware that an apparatus for manufacturing air-gas, and enriching other gas in which the carbonaceous matter is enclosed within an air-forcing apparatus, consisting of a gravitating air-holder and water-receptacle, has heretofore been made, and I, therefore, do not claim such invention; but having fully described my invention, What I do claim, and desire to secure by Letters Patent, is—

1. The closed gas-generator $d$, provided with the circular diaphragms $g$, radiating perforated diaphragms $f$, and pipes $h\ e\ i$, all arranged as and for the purpose specified.

2. The within-described arrangement of the gas-generator $d$ and $k$, with relation to each other, and to the gasometer $a\ b$, as and for the purpose specified.

ROBERT ALSOP.

Witnesses:
CHARLES LEGGE,
CHARLES G. C. SIMPSON.